UNITED STATES PATENT OFFICE 2,211,626

ALCOHOLYSIS OF β-ALKOXY METHYL ETHERS

Donald J. Loder, William F. Gresham, and Donald B. Killian, Wilmington, Del., assignors to E. I. du Pont de Nemours & Company, Wilmington, Del., a corporation of Delaware No Drawing. Application February 24, 1939, Serial No. 258,179

12 Claims. (Cl. 260—635)

This invention relates to a process for the preparation of glycerol and particularly to a process of preparing it from glycerol beta (alkoxy methyl) ethers.

The product of the present invention is glycerol (propanetriol), $CH_2OH.CHOH.CH_2OH$, which has heretofore generally been prepared by the fermentation of sugar, by the hydrolysis of oils and fats, from trichlorpropane and by the reduction of dihydroxy acetone. In accord with the process of the present invention, glycerol is obtained by the alcoholysis of glycerol beta (alkoxy methyl) ethers having the generic formula, $$CH_2OH.CH(OXOY).CH_2OH,$$

wherein X is a methylene or substituted methylene group and Y is an alkyl group, specific examples of which are glycerol beta (methoxy methyl) ether, $CH_2OH.CH(OCH_2OCH_3).CH_2OH$; glycerol beta (ethoxy methyl) ether, $$CH_2OH.CH(OCH_2OC_2H_5).CH_2OH;$$

glycerol beta (propoxy methyl) ether, $$CH_2OH.CH(OCH_2OC_3H_7).CH_2OH;$$

glycerol beta (alpha methoxy ethyl) ether,

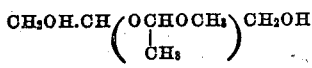

and the like, which compounds may be prepared by reacting glycolic acid with a formal in accord with the process disclosed in the copending application of Donald J. Loder, et al., S. N. 256,855, filed February 17, 1939.

An object of the present invention is to provide a process for the preparation of glycerol. A further object of the invention is to provide such a process wherein glycerol is obtained from beta-substituted glycerol ethers in which a hydrogen of an ether group has been replaced by an alkoxy or substituted alkoxy group. A further object of the invention is to provide a process whereby an alkoxy alkyl group of a glycerol beta (alkoxy methyl) ether is replaced by a hydrogen atom. Other objects and advantages of the invention will hereinafter appear.

Glycerol may be made in accord with the process of this invention by interacting a glycerol beta-(alkoxy alkyl) ether having the generic formula, $CH_2OH.CH_2(OXOY).CH_2OH$, wherein X is a methylene or substituted methylene group and Y is an alkyl group such as methyl, ethyl, propyl, butyl, isobutyl, or higher alkyl groups or an aryl group such as benzyl, tolyl, etc., by interacting the glycerol ether with an alcohol (preferably an alcohol, the alkyl group of which is the same as the Y group of the compound reacted) in the presence of inorganic acids, for example, sulfuric, phosphoric and, more particularly, the halogen acids such as hydrochloric, hydrobromic, hydriodic acids, etc. The reaction proceeds substantially in accord with the reaction:

$$CH_2OH.CH(OCH_2OR)CH_2OH+ROH \rightarrow$$
$$CH_2OH.CHOH.CH_2OH+CH_2(OR)_2$$

wherein R is an alkyl or aryl group.

The reaction is conducted by refluxing a mixture of the glycerol ether, alcohol and catalyst at a temperature ranging between 40 and 120° C., the temperature being determined by the boiling point of the mixture and pressure above it. The alcohol should be present, on a molal basis, preferably in excess, over the ether, although equimolar proportions or even lower proportions may be used. Ordinarily, the reaction proceeds satisfactorily at atmospheric pressure, although pressures in excess of atmospheric or pressures below atmospheric may be employed, if desired.

The more detailed practice of the invention is illustrated by the following examples in which parts given are by weight unless otherwise stated. There are, of course, many forms of the invention other than these specific embodiments.

*Example 1.*—An autoclave provided with a fractionating column was charged with 136 parts of glycerol beta (methoxy methyl) ether, 48 parts of methanol and 0.2 part of sulfuric acid. The temperature was raised to approximately 45° C. and during the operation a methylal-methanol azeotrope (containing 92% methylal) was removed by fractionation continuously as formed. Heating was stopped when methanol alone distilled over, the surfuric acid was then neutralized with caustic, and the glycerol product recovered in good yield by distillation under reduced pressure. The yield of glycerol was substantially quantitative.

*Example 2.*—An autoclave provided with a fractionating column was charged with 40 parts of glycerol beta (ethoxy-methyl) ether, 50 parts of 95% ethanol and 0.5 part of sulfuric acid. The temperature was raised to approximately 75° C. and during the operation an ethylal-ethanol-water azeotrope (containing approximately 6.9% ethylal) was removed by fractionation continuously as formed. Heating was stopped when ethanol alone distilled over and glycerol recovered as in Example 1.

From a consideration of the above specification, it will be appreciated that many changes may be made therein without departing from the scope of the invention or sacrificing any of its advantages.

We claim:

1. A process for the preparation of glycerol which comprises replacing by alcoholysis and with hydrogen the alkoxy alkyl group of a glycerol beta-(alkoxy alkyl) ether.

2. A process for the preparation of glycerol which comprises reacting an alcohol with a glycerol beta-alkoxy methyl ether having the generic formula, $CH_2OH.CH(OXOY).CH_2OH$, in which X is selected from the group consisting of methylene and substituted methylene groups and Y is an alkyl group, in the presence of a hydrolyzing catalyst.

3. A process for the preparation of glycerol which comprises reacting an alcohol with glycerol beta-(methoxy methyl) ether in the presence of a hydrolyzing catalyst.

4. A process for the preparation of glycerol which comprises reacting an alcohol with glycerol beta-(ethoxy methyl) ether in the presence of a hydrolyzing catalyst.

5. A process for the preparation of glycerol which comprises reacting an alcohol with glycerol beta-(propoxy methyl) ether in the presence of a hydrolyzing catalyst.

6. A process for the preparation of glycerol which comprises reacting a glycerol beta-(alkoxy alkyl) ether with an alcohol and a hydrolyzing catalyst and thereby replacing the alkoxy alkyl group of the glycerol beta-(alkoxy alkyl) ether by hydrogen.

7. A process for the preparation of glycerol which comprises reacting a glycerol beta-(alkoxy alkyl) ether with an alcohol and a hydrolyzing catalyst, distilling off the formal formed and continuing the reaction until substantially no more formal distills over.

8. A process for the preparation of glycerol which comprises reacting a mixture containing a glycerol beta-(methoxy methyl) ether, methanol and a hydrolyzing catalyst until substantially all of the methoxy methyl group of the glycerol beta-(methoxy methyl) ether has been converted to methylal.

9. A process for the preparation of glycerol which comprises reacting a mixture containing a glycerol beta-(ethoxy methyl) ether, ethanol and a hydrolyzing catalyst until substantially all of the ethoxy methyl group of the glycerol beta-(ethoxy methyl) ether has been converted to diethyl ether of methylene glycol.

10. A process for the preparation of glycerol which comprises reacting a mixture containing a glycerol beta-(propoxy methyl) ether, propanol and a hydrolyzing catalyst until substantially all of the propoxy methyl group of the glycerol beta-(propoxy methyl) ether has been converted to dipropyl ether of ethylene glycol.

11. A process for the preparation of glycerol which comprises reacting approximately 136 parts of glycerol beta-(methoxy methyl) ether with approximately 48 parts of methanol and 0.2 part of sulfuric acid, distilling off the methylal formed and recovering glycerol from the reaction product.

12. A process for the preparation of glycerol which comprises reacting approximately 40 parts of glycerol beta-(ethoxy methyl) ether with approximately 50 parts of 95% ethanol in the presence of 0.5 part of sulfuric acid, conducting the reaction at approximately 75° C. and during the reaction removing by distillation an ethylal-ethanol-water azeotrope, continuing the removal of the azeotrope until substantially no ethylal is contained therein and subsequently recovering glycerol from the reaction product.

DONALD B. KILLIAN.
WILLIAM F. GRESHAM.
DONALD J. LODER.